(12) United States Patent
Logunov (10) Patent No.: US 11,105,967 B2
(45) Date of Patent: Aug. 31, 2021

(54) ILLUMINATION SYSTEMS INCLUDING LIGHT DIFFUSING OPTICAL FIBERS WITH NANO-SIZED PARTICLES, AND LIGHT SOURCES PROJECTING LIGHT AT AN ANGLE INTO AN INPUT END FACE OF THE OPTICAL FIBERS

(71) Applicant: CORNING INCORPORATED, Corning, NY (US)

(72) Inventor: Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/604,749

(22) PCT Filed: Apr. 10, 2018

(86) PCT No.: PCT/US2018/026820
§ 371 (c)(1),
(2) Date: Oct. 11, 2019

(87) PCT Pub. No.: WO2018/191220
PCT Pub. Date: Oct. 18, 2018

(65) Prior Publication Data
US 2020/0379156 A1 Dec. 3, 2020

Related U.S. Application Data (60) Provisional application No. 62/484,098, filed on Apr. 11, 2017.

(51) Int. Cl.
*G02B 6/02* (2006.01)
*F21V 8/00* (2006.01)

(52) U.S. Cl.
CPC ............ *G02B 6/001* (2013.01); *G02B 6/0006* (2013.01); *G02B 6/0229* (2013.01)

(58) Field of Classification Search
CPC ...... G02B 6/001; G02B 6/0229; G02B 6/006; G02B 6/4298; F21V 2200/15
See application file for complete search history.

(56) References Cited

U.S. PATENT DOCUMENTS 4,422,719 A * 12/1983 Orcutt ............... B29D 11/00711
                                                       385/123
5,579,429 A * 11/1996 Naum .................... G02B 1/046
                                                       385/143

(Continued)

FOREIGN PATENT DOCUMENTS

CN     86101093 A     11/1986
CN    101541377 A      9/2009

(Continued)

OTHER PUBLICATIONS

International Search Report and Written Opinion of the International Searching Authority; PCT/US2018/026820; dated Jun. 27, 2018; 16 Pages; European Patent Office.

(Continued)

*Primary Examiner* — Ismael Negron
(74) *Attorney, Agent, or Firm* — Payal A. Patel; Svetlana Short (57) ABSTRACT

An illumination system includes a light source, and an optical fiber having opposed first and second end faces, a core, a cladding surrounding the core, an outer surface, and a plurality of nano-sized structures configured to scatter light traveling within the optic fibers towards the outer surface. The light source has an effective numerical aperture $NA_O$, the optical fiber has a numerical aperture $NA_{LDF}$ which is more than the effective numerical aperture $NA_O$ of the light source. The light source is optically coupled to the first end (Continued)

of the optical fiber such that a propagation pathway of light outputted by the light source forms an incident angle θi, with respect to the first end face, that is non-orthogonal to the first end face and within approximately 5° of $\sin^{-1} NA_{LDF} - \sin^{-1} NA_O$.

20 Claims, 4 Drawing Sheets

(56) References Cited

U.S. PATENT DOCUMENTS

| | | | | |
|---|---|---|---|---|
| 5,903,695 | A * | 5/1999 | Zarian | G02B 6/02 |
| | | | | 385/127 |
| 6,154,595 | A * | 11/2000 | Yokogawa | G02B 6/02033 |
| | | | | 385/127 |
| 6,285,855 | B1 * | 9/2001 | Tsuji | G03F 7/70075 |
| | | | | 359/618 |
| 6,550,942 | B1 * | 4/2003 | Zou | G02B 6/001 |
| | | | | 362/347 |
| 7,450,806 | B2 | 11/2008 | Bookbinder et al. | |
| 8,582,943 | B2 * | 11/2013 | Alkemper | C03C 13/046 |
| | | | | 385/124 |
| 8,591,087 | B2 | 11/2013 | Bickham et al. | |
| 8,620,125 | B2 | 12/2013 | Button et al. | |
| 8,805,141 | B2 | 8/2014 | Fewkes et al. | |
| 9,366,796 | B2 * | 6/2016 | Irie | B60Q 3/64 |
| 9,851,500 | B2 * | 12/2017 | Logunov | G02B 6/02342 |
| 2005/0074216 | A1 * | 4/2005 | Irie | G02B 6/001 |
| | | | | 385/127 |
| 2012/0275178 | A1 | 11/2012 | Logunov | |
| 2013/0088888 | A1 | 4/2013 | Fewkes et al. | |
| 2014/0268815 | A1 | 9/2014 | Li et al. | |
| 2014/0355295 | A1 * | 12/2014 | Kuchinisky | G02B 6/001 |
| | | | | 362/558 |

FOREIGN PATENT DOCUMENTS

| | | |
|---|---|---|
| CN | 102057307 A | 5/2011 |
| CN | 103858032 A | 6/2014 |
| CN | 105683792 A | 6/2016 |
| TW | 201815720 A | 5/2018 |
| WO | 2016178962 A1 | 11/2016 |

OTHER PUBLICATIONS

Chinese Patent Application No. 201880032007.8, Office Action dated Nov. 19, 2020, 18 pages; Chinese Patent Office.
Chinese Patent Application No. 201880032007.8, Office Action dated Jun. 28, 2021, 5 pages (English Translation Only); Chinese Patent Office.
European Patent Application No. 18720738.6, Office Action dated Apr. 23, 2021; 5 pages; European Patent Office.

* cited by examiner

ILLUMINATION SYSTEMS INCLUDING LIGHT DIFFUSING OPTICAL FIBERS WITH NANO-SIZED PARTICLES, AND LIGHT SOURCES PROJECTING LIGHT AT AN ANGLE INTO AN INPUT END FACE OF THE OPTICAL FIBERS

CROSS-REFERENCE TO RELATED APPLICATIONS

This application is a national stage application under 35 U.S.C. § 371 of International Patent Application Serial No. PCT/US2018/026820, filed on Apr. 10, 2018, which claims the benefit of priority under 35 U.S.C. § 119 of U.S. Provisional Application Ser. No. 62/484,098 filed on Apr. 11, 2017, the contents of which are relied upon and incorporated herein by reference in their entireties.

BACKGROUND

The present disclosure relates to illumination systems. More specifically, the present disclosure relates to illumination systems that include light diffusing optical fibers for providing illumination.

BRIEF SUMMARY

According to the subject matter of the present disclosure, an illumination system includes a light diffusing optical fiber and a light output device having a light source. The light diffusing optical fiber includes a first end, a second end opposite the first end, a core, a cladding surrounding the core, an outer surface, and a plurality of nano-sized structures positioned within the core, the cladding, or both the core and the cladding. The plurality of nano-sized structures are configured to scatter guided light toward the outer surface of the light diffusing optical fiber such that a portion of the guided light diffuses through the outer surface along a diffusion length of the light diffusing optical fiber. The light diffusing optical fiber has a numerical aperture $NA_{LDF}$. The light output device has an effective numerical aperture $NA_O$, which is less than the numerical aperture $NA_{LDF}$ of the light diffusing optical fiber. Further, the light output device is optically coupled to an end face of the first end of the light diffusing optical fiber such that light output by the light source of the light output device irradiates the end face at an incident angle $\theta_i$ that is non-orthogonal to the end face and is within approximately 5° of $\sin^{-1} NA_{LDF} - \sin^{-1} NA_O$.

In accordance with another embodiment of the present disclosure, a method includes directing light output by a light source of a light output device into an end face of a first end of a light diffusing optical fiber at a first incident angle $\theta_{i1}$. The light diffusing optical fiber includes the first end, a second end opposite the first end, a core, a cladding surrounding the core, an outer surface, and a plurality of nano-sized structures positioned within the core, the cladding, or both the core and the cladding. The plurality of nano-sized structures are configured to scatter guided light toward the outer surface of the light diffusing optical fiber such that a portion of the guided light diffuses through the outer surface along a diffusion length of the light diffusing optical fiber. The light diffusing optical fiber has a numerical aperture $NA_{LDF}$. The light output device has an effective numerical aperture $NA_O$, which is less than the numerical aperture $NA_{LDF}$ of the light diffusing optical fiber. Further, the first incident angle $\theta_{i1}$ is non-orthogonal to the end face of the first end of the light diffusing optical fiber and is within approximately 5° of $\sin^{-1} NA_{LDF} - \sin^{-1} NA_O$. The method also includes altering a relative angular position between the light output device and the end face of the first end of the light diffusing optical fiber such that light output by the light source of the light output device is directed into the end face of the first end of the light diffusing optical fiber at a second incident angle $\theta_{i2}$ that is non-orthogonal to the end face and is within approximately 5° of $\sin^{-1} NA_{LDF} - \sin^{-1} NA_O$.

In accordance with yet another embodiment of the present disclosure, an illumination system includes a light diffusing optical fiber and a light output device having a light source. The light diffusing optical fiber includes a first end, a second end opposite the first end, a core, a cladding surrounding the core, an outer surface, and a plurality of nano-sized structures positioned within the core, the cladding, or both the core and the cladding. The plurality of nano-sized structures are configured to scatter guided light toward the outer surface of the light diffusing optical fiber such that a portion of the guided light diffuses through the outer surface along a diffusion length of the light diffusing optical fiber. The light diffusing optical fiber has a numerical aperture $NA_{LDF}$. The light output device has an effective numerical aperture $NA_O$, which is less than the numerical aperture $NA_{LDF}$ of the light diffusing optical fiber. Further, the light output device is optically coupled to an end face of the first end of the light diffusing optical fiber such that light output by the light source of the light output device irradiates the end face at an incident angle $\theta_i$ that is non-orthogonal to the end face. Moreover, the diffusion length of the light diffusing optical fiber includes an equilibrium coupling length extending from the end face of the first end of the light diffusing optical fiber a distance of about 5% of the diffusion length or less.

Although the concepts of the present disclosure are described herein with primary reference to illumination systems having light diffusing optical fibers, it is contemplated that the concepts will enjoy applicability to any illumination system.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Referring now to FIGS. 1A-4B, an illumination system 100 comprises a light diffusing optical fiber 110 optically coupled to a light output device 140 that includes a light source 142. The light diffusing optical fiber 110 comprises a first end 112, a second end 114 opposite the first end 112, a core 120, a cladding 122 surrounding the core 120, an outer surface 128, and a plurality of nano-sized structures 125 positioned within the core 120, the cladding 122, or both the core 120 and the cladding 122. The plurality of nano-sized structures 125 are configured to scatter guided light (e.g., light output by the light output device 140 that is propagating along the light diffusing optical fiber 110) toward the outer surface 128 of the light diffusing optical fiber 110 such that a portion of the guided light diffuses through the outer surface 128 along a diffusion length of the light diffusing optical fiber 110.

As used herein, "diffusion length," is the length of the light diffusing optical fiber 110 extending from the first end 112 of the light diffusing optical fiber 110 (or from any end receiving input light) to a location along the length of the light diffusing optical fiber 110 where 90% of the guided light has diffused from the light diffusing optical fiber 110. As used herein, the term "light-diffusing" means that light scattering is substantially spatially continuous along at least a portion of the length of the light diffusing optical fiber 110, i.e., there are no substantial jumps or discontinuities such as those associated with discrete (e.g., point) scattering. Thus, the concept of substantially continuous light emission or substantially continuous light scattering as set forth in the present disclosure refers to spatial continuity.

Referring still to FIGS. 1A-4B, the light diffusing optical fiber 110 has a numerical aperture $NA_{LDF}$ and the light output device 140 comprises an effective numerical aperture $NA_O$, which is less than the numerical aperture $NA_{LDF}$ of the light diffusing optical fiber 110. As used herein, the effective numerical aperture $NA_O$ of the light output device 140 is the numerical aperture that characterizes the emission of light from the light output device 140. For example, the effective numerical aperture $NA_O$ of the light output device 140 may be a numerical aperture $NA_S$ of the light source 142. Further, in embodiments in which the light output device 140 comprises additional optical components positioned between the light source 142 and the first end 112 of the light diffusing optical fiber 110, the effective numerical aperture $NA_O$ may be altered by these additional optical components.

While not intending to be bound by theory, if the effective numerical aperture $NA_O$ of the light output device 140 is lower than the numerical aperture $NA_{LDF}$ of the light diffusing optical fiber 110, then light entering the light diffusing optical fiber 110 will fill the mode content of the light diffusing optical fiber 110 after traversing an "equilibrium coupling length." As used herein, "equilibrium coupling length" is the portion of the light diffusing optical fiber extending from an end face 116, 116' of the first end 112 of the light diffusing optical fiber 110 to a location along the diffusion length at which light propagating along the light diffusing optical fiber 110 comprises a static mode distribution. This location of initial static mode distribution is the end of the equilibrium coupling length. While not intending to be limited by theory, during static mode distribution, all modes of light propagating along the light diffusing optical fiber 110 are in equilibrium. Further, because it takes a certain distance to completely fill the mode content of the light diffusing optical fiber 110 (e.g., the equilibrium coupling length), the brightness at the beginning portion of the light diffusing optical fiber 110 (i.e., illumination provided by the light diffusing optical fiber 110) does not immediately decrease with increasing fiber length due to light redistribution between modes through diffusion.

Instead, while not intending to be limited by theory, the guided light propagating along the diffusion length of the light diffusing optical fiber 110 reaches peak intensity at the end of the equilibrium coupling length. Beyond the end of the equilibrium coupling length, the intensity of light propagating along the diffusion length of the light diffusing optical fiber 110 decays exponentially via light diffusion through the outer surface 128 of the light diffusing optical fiber 110. Although the amount of guided light propagating along the diffusion length of the light diffusing optical fiber 110 decays, the amount of light diffusing from the outer surface 128 of the light diffusing optical fiber 110 along the diffusion length remains substantially constant, providing uniform illumination. As used herein, "uniform illumination" refers to illumination along the length of the light diffusing optical fiber 110 in which the intensity of light emitted from the light diffusing optical fiber 110 does not vary by more than 25% over the specified length.

Figure 1A:
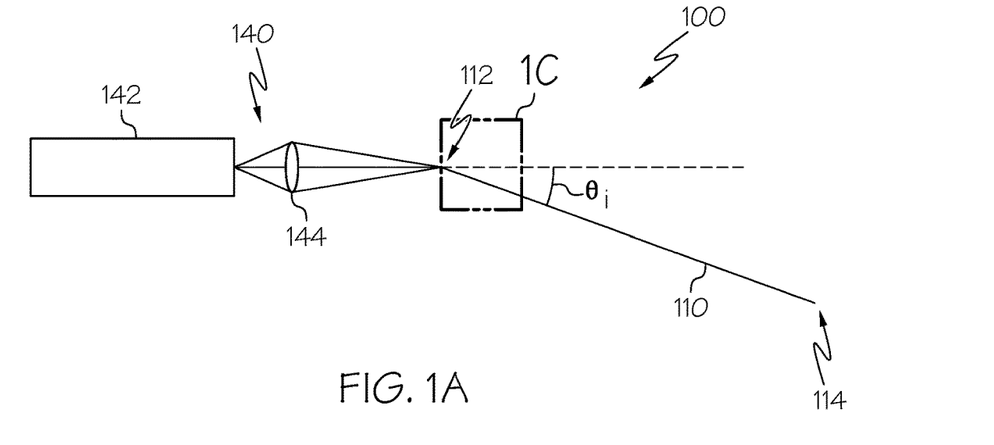
FIG. 1A schematically depicts an illumination system comprising a light output device that includes a light source and a lens, and a light diffusing optical fiber, according to one or more embodiments shown and described herein.
Figure 1B:
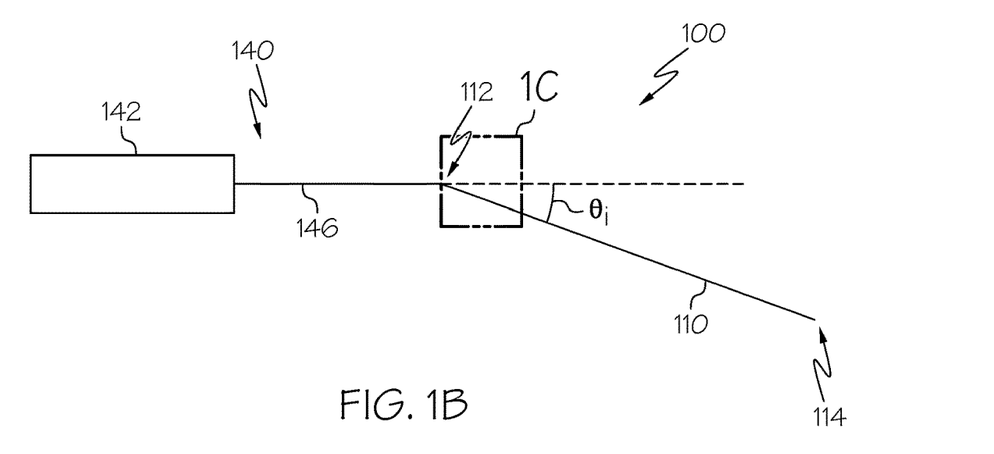
FIG. 1B schematically depicts an illumination system comprising a light output device that includes a light source and an optical delivery fiber, and a light diffusing optical fiber, according to one or more embodiments shown and described herein.
Figure 1C:
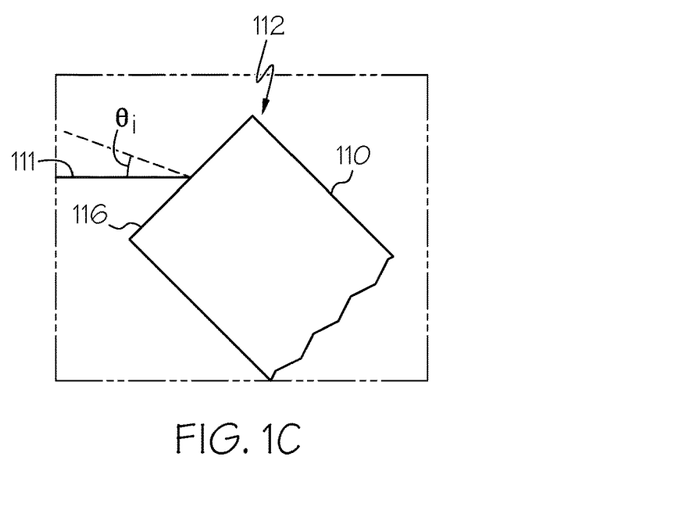
FIG. 1C schematically depicts a first end of the light diffusing optical fiber of the illumination systems of FIGS. 1A and 1B, according to one or more embodiments shown and described herein.
Figure 2A:
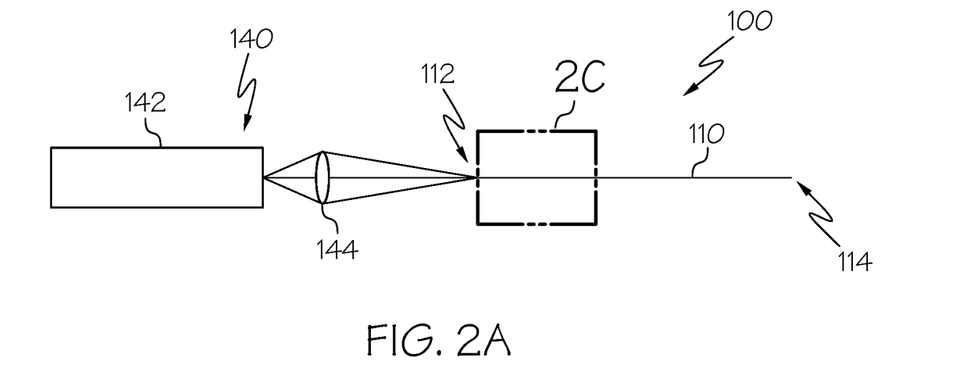
FIG. 2A schematically depicts an illumination system comprising a light output device that includes a light source and a lens, and a light diffusing optical fiber, according to one or more embodiments shown and described herein.
Figure 2B:
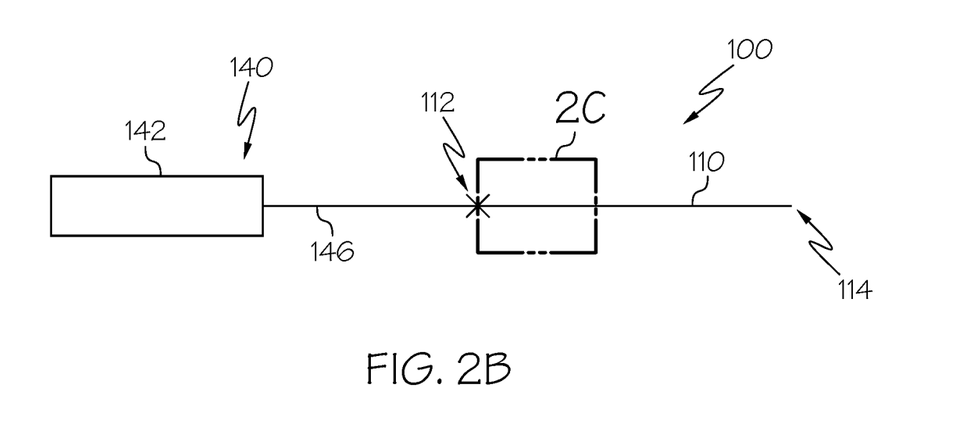
FIG. 2B schematically depicts an illumination system comprising a light output device that includes a light source and an optical delivery fiber, and a light diffusing optical fiber, according to one or more embodiments shown and described herein.
Figure 2C:
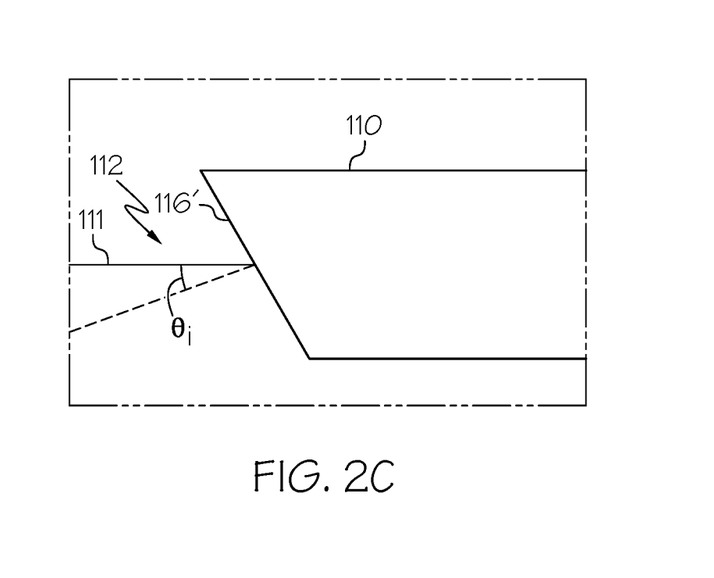
FIG. 2C schematically depicts a first end of the light diffusing optical fiber of the illumination systems of FIGS. 2A and 2B, according to one or more embodiments shown and described herein.

Moreover, by shortening the equilibrium coupling length, peak intensity may be reached closer to the first end 112 of the light diffusing optical fiber 110 and the length of the light diffusing optical fiber 110 emitting uniform illumination may be maximized. While not intending to be limited by theory, when the effective numerical aperture $NA_O$ of the light output device 140 is lower than the numerical aperture $NA_{LDF}$ of the light diffusing optical fiber 110, the equilibrium coupling length may be reduced by aligning the light output device 140 and the first end 112 of the light diffusing optical fiber 110 relative to one another such that light output by the light output device 140 irradiates the end face 116, 116' at an incident angle $\theta_i$ that is non-orthogonal to the end face 116, 116', as depicted in FIGS. 1A-2C. In some embodiments, as depicted in FIGS. 1A-1C, the end face 116, 116' of the first end 112 of the light diffusing optical fiber 110 may be a normal (e.g., perpendicular) end face 116 and the incident angle $\theta_i$ is formed by positioning the normal end face 116 of the first end 112 at an angle with respect to a light propagation pathway 111, which is representative of the pathway of light output by the light source 142, at the end face 116, 116'. In other embodiments, as depicted in FIGS. 2A-2C, the end face 116, 116' of the first end 112 may be an angled end face 116' and the incident angle $\theta_i$ may be formed even when the light diffusing optical fiber 110 is parallel with the light propagation pathway 111 at the angled end face 116'.

The incident angle $\theta_i$ is related to a relative relationship between the numerical aperture $NA_{LDF}$ of the light diffusing optical fiber 110 and the effective numerical aperture $NA_O$ of the light output device 140. For example, the incident angle $\theta_i$ may be within approximately 10° of $\sin^{-1} NA_{LDF} - \sin^{-1} NA_O$, for example, within 9°, 8°, 7°, 6°, 5°, 4°, 3, 2°, 1°, or the like. In some embodiments, the incident angle $\theta_i$ may be approximately equal to $\sin^{-1} NA_{LDF} - \sin^{-1} NA_O$. As non-limiting examples, the incident angle $\theta_i$ may be from about 5° to about 25°, for example, about 10° to about 25°, 10° to about 20°, 15° to about 25°, 5° to about 15, 12° to about 16°, 5° to about 25° or the like. As one non-limiting example, numerical aperture $NA_{LDF}$ of the light diffusing optical fiber 110 comprises 0.53 and the effective numerical aperture $NA_O$ of the light output device 140 comprises 0.25 such that $\sin^{-1} NA_{LDF} - \sin^{-1} NA_O$ is about 17.5°. Examples of the light diffusing optical fiber 110 described herein may comprise a numerical aperture $NA_{LDF}$ of from about 0.25 to about 0.55, such as about 0.3, 0.35, 0.4, 0.45, 0.5, 0.53, or the like, for example, about 0.25 to about 0.53 and examples of the light output device 140 described herein may comprise an effective numerical aperture $NA_O$ of from about 0.1 to about 0.3, such as about 0.12, 0.15, 0.2, 0.25, or the like, for example, about 0.12 to about 0.3.

Figure 3:
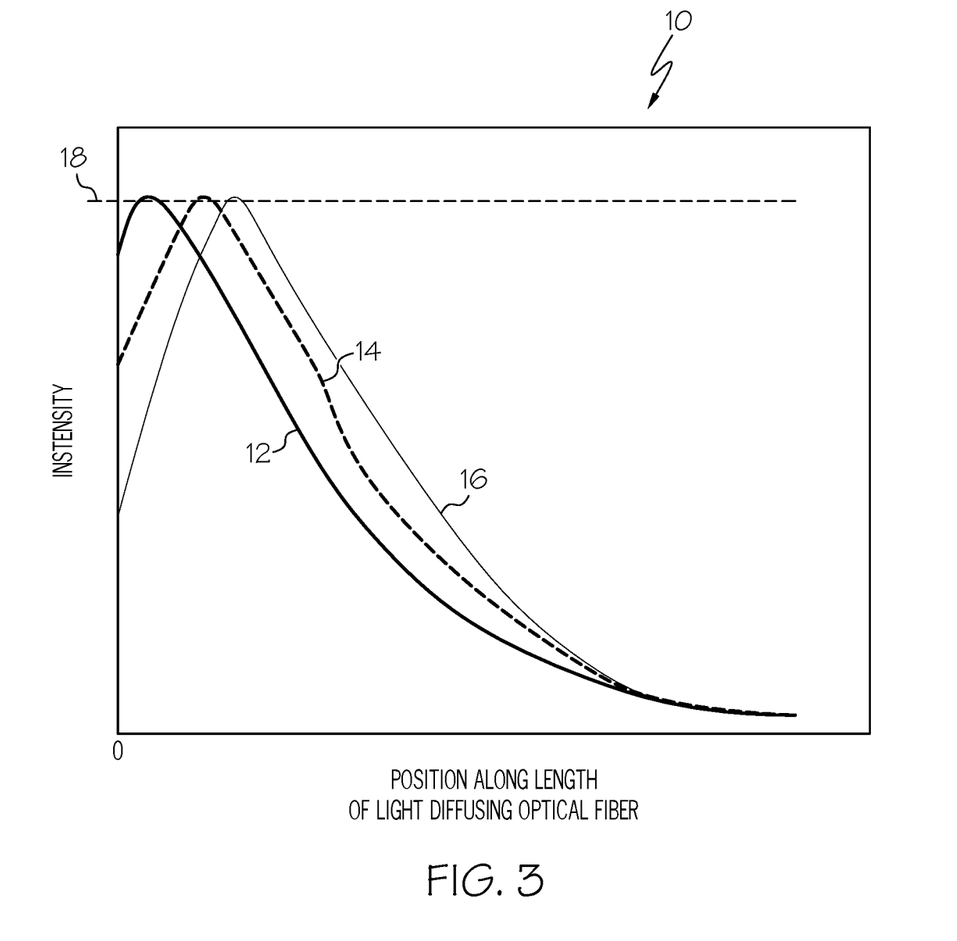
FIG. 3 graphically depicts the intensity of light propagating along a light diffusing optical fiber, according to one or more embodiments shown and described herein.

Referring now to FIG. 3, graph 10 graphically depicts the intensity of diffused light at the outer surface 128 of light diffusing optical fiber 110 at positions along the length of the light diffusing optical fiber 110, where the zero "0" length position shown in FIG. 3 is the end face 116, 116' of first end 112 (or alternatively, the end of the light diffusing optical fiber 110 into which light enters). Lines 14 and 16 of FIG. 3 graphically the intensity of diffused light at the outer surface 128 of light diffusing optical fiber 110 at positions along the length of the light diffusing optical fiber 110 in an embodiment in which light irradiates the end face 116, 116' substantially orthogonal to the end face 116, 116'. For example, line 14 graphically depicts the intensity of diffused light at the outer surface 128 when light output by a light output device 140 comprising a light source 142 and no intervening optical components irradiates the end face 116, 116' at an angle orthogonal to the end face 116, 116' and line 16 graphically depicts the intensity of diffused light at the outer surface 128 when light output by a light output device 140 comprising a light source 142 and an optical delivery fiber 146 irradiates the end face 116, 116' at an angle orthogonal to the end face 116, 116'. Further, line 12 graphically depicts the intensity of diffused light at the outer surface 128 of light diffusing optical fiber 110 at positions along the length of the light diffusing optical fiber 110 when light output by the light output device 140 irradiates the end face 116, 116' at the incident angle θ. As shown in FIG. 3, the equilibrium coupling distance is minimized by irradiating the end face 116, 116' at the incident angle $\theta_i$, as line 12 reaches a peak intensity 18 closer to the end face 116, 116' of first end 112 (e.g., closer to the zero length position) than either of lines 14 and 16.

In operation, when light output by the light source 142 of the light output device 140 irradiates the end face 116, 116' of the first end 112 of the light diffusing optical fiber 110 at the incident angle $\theta_i$, the equilibrium coupling length may comprise a distance of about 15% of the diffusion length or less, for example about 10% of the diffusion length or less, about 5% of the diffusion length or less, about 3% of the diffusion length or less, or the like, such as about 0.5% to about 15% of the diffusion length, for example, about 1% to about 10% of the diffusion length, about 2% to about 5% of the diffusion length, or the like. Further, when light output by the light source 142 of the light output device 140 irradiates the end face 116, 116' of the first end 112 of the light diffusing optical fiber 110 at the incident angle $\theta_i$, the incident angle $\theta_i$ induces a coupling loss of about 3 dB or less at the end face 116, 116', for example, about 2 dB or less, 1.5 dB or less, 1 dB or less, 0.5 dB or less, 0.2 dB or less, 0.1 dB or less, or the like.

Referring again to FIGS. 1A-2C, the light output device 140 is optically coupled to the first end 112 of the light diffusing optical fiber 110 such that light output by the light source 142 of the light output device 140 may irradiate the end face 116, 116' of the first end 112 of the light diffusing optical fiber 110 and enter the light diffusing optical fiber 110. The light source 142 may comprise a light-emitting diode (LED), a laser diode, or the like. For example, the light source 142 may comprise a multimode laser diode, single mode laser diode, a SiP laser diode, a VCSEL laser diode, or another type of semiconductor laser diode. Further, the light source 142 may be configured to generate light in the 200 nm to 2000 nm wavelength range.

The light output device 140 may further comprise a lens 144 optically coupled to the light source 142, as depicted in FIGS. 1A and 2A. In this embodiment, the light diffusing optical fiber 110 is optically coupled to the lens 144 and the lens 144 comprises a numerical aperture $NA_L$. The lens 144 may be positioned between and optically coupled to the first end 112 of the light diffusing optical fiber 110 such that the lens 144 may focus light output by the light source 142 onto the end face 116, 116' of the light diffusing optical fiber 110. Further, when the lens 144 is positioned between and optically coupled to the light source 142 and the end face 116, 116' of the first end 112 of the light diffusing optical fiber 110, the effective numerical aperture $NA_O$ of the light output device is a numerical aperture $NA_L$ of the lens 144.

The light output device 140 may also comprise an optical delivery fiber 146 optically coupled to the light source 142, as depicted in FIGS. 1B and 2B. The optical delivery fiber 146 may be optically coupled to the light diffusing optical fiber 110 using an optical fiber coupler or by splicing the first end 112 of the light diffusing optical fiber 110 to an adjacent end of the optical delivery fiber 146. The optical delivery fiber 146 comprises a numerical aperture $N_{DEL}$. The optical delivery fiber 146 may comprise a transmission fiber or a fiber that provides light amplification (e.g., a fiber that includes gain medium in the core). The optical delivery fiber 146 is configured to induce low light loss along its length, such that light output by the light source 142 may traverse the optical delivery fiber 146 and enter the light diffusing optical fiber 110 with sufficient intensity to illuminate the light diffusing optical fiber 110. Further, the optical delivery fiber 146 allows the light source 142 to be spatially separated from the light diffusing optical fiber 110. In some embodiments, when the optical delivery fiber 146 is positioned between and optically coupled to the light source 142 and the end face 116, 116' of the first end 112 of the light diffusing optical fiber 110 and the numerical aperture $N_{DEL}$ of the optical delivery fiber 146 is smaller than the numerical aperture $NA_S$ of the light source 142, the effective numerical aperture $NA_O$ of the light output device 140 is the numerical aperture $N_{DEL}$ of the optical delivery fiber 146. In other embodiments, when the optical delivery fiber 146 is positioned between and optically coupled to the light source 142 and the end face 116, 116' of the first end 112 of the light diffusing optical fiber 110 the effective numerical aperture $NA_O$ of the light output device 140 may be the numerical aperture $N_{DEL}$ of the optical delivery fiber 146, the numerical aperture $NA_S$ of the light source 142, or a numerical aperture therebetween.

In some embodiments, no intervening optical components are positioned between the light source 142 and the end face of the first end of the light diffusing optical fiber such that the effective numerical aperture $NA_O$ of the light output device is a numerical aperture $NA_S$ of the light source. While a single light output device 140 is depicted in FIGS. 1A, 1B, 2A, and 2B, in other embodiments, the illumination system 100 may comprise additional light output devices, for example, a second light output device optically coupled to the second end 114 of the light diffusing optical fiber 110. Further, while a single light diffusing optical fiber 110 is depicted in FIGS. 1A-2C, it should be understood that any number of light diffusing optical fibers 110 are contemplated.

In operation, because light emitted by the light source 142 is scattered into the surrounding environment by the light diffusing optical fiber 110, the light source 142 may be positioned at a location remote from the light diffusing optical fiber 110. Accordingly, any thermal heat generated by the light source 142 may be transferred away from the light source 142 to locations remote from both the light source 142 and the light diffusing optical fiber 110. Thus, the temperature of the light diffusing optical fiber 110 may remain substantially similar to the ambient temperature of the surrounding environment and the lighting unit may be described as a thermally "cool" lighting unit. Further, spatially separating the light diffusing optical fiber 110 and the light source 142 may provide additional design flexibility to the illumination system 100.

Figure 4A:
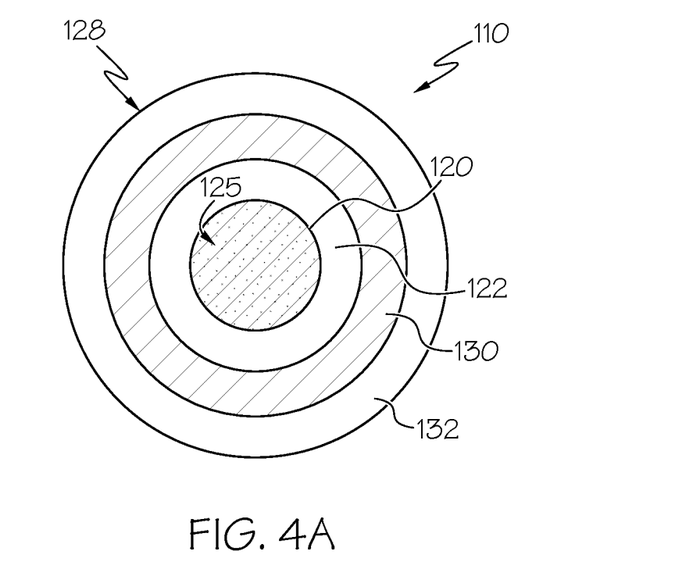
FIG. 4A schematically depicts a cross section of a light diffusing optical fiber, according to one or more embodiments shown and described herein.
Figure 4B:
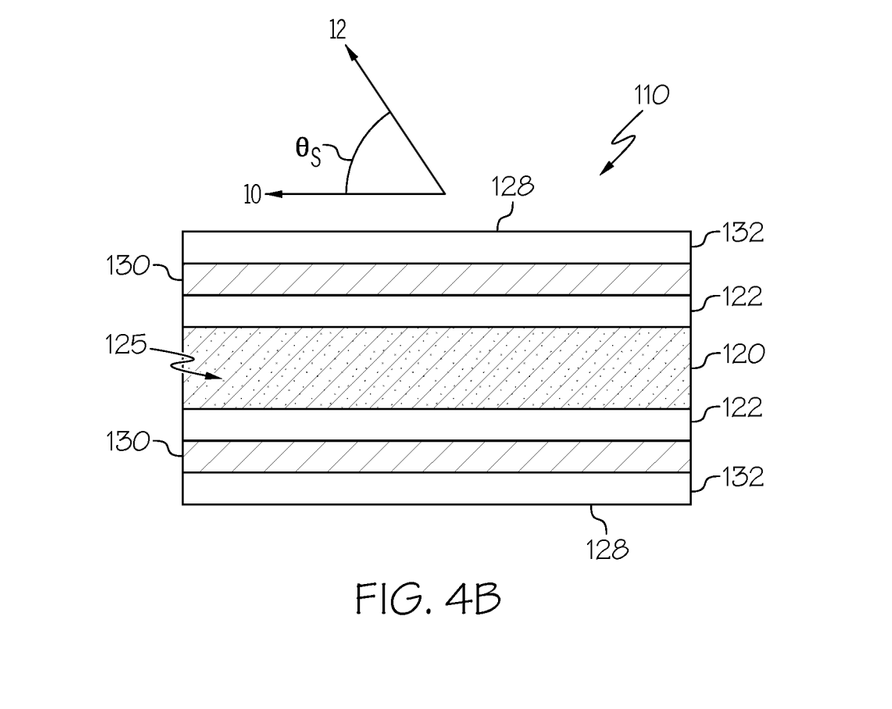
FIG. 4B schematically depicts another cross section of a light diffusing optical fiber, according to one or more embodiments shown and described herein.

Referring now to FIGS. 4A and 4B, cross sections of an embodiment of the light diffusing optical fiber 110 comprising the core 120, the cladding 122 surrounding the core 120, the outer surface 128 and the plurality of nano-sized structures 125 are depicted. The core 120 may be a glass core, for example, silica, germania doped silica, fluorine-doped silica, or a polymer core, such as a low index polymer. The cladding 122 may be a glass cladding, for example, pure silica, F-doped silica, or F(fluorine)/B(boron) co-doped silica, or a polymer cladding. In some embodiments, the core 120, the cladding 122, or both may include an updopant or a downdopant. As used herein, an "updopant" is a dopant which has a propensity to raise the refractive index relative to pure undoped silica and a "downdopant" is a dopant which has a propensity to lower the refractive index relative to pure undoped silica. Further, the light diffusing optical fiber 110 will may comprise a length (e.g., a length between the first end 112 and the second end 114) of from about 0.15 m to about 100 m, for example, about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

Referring still to FIGS. 4A and 4B, the nano-sized structures 125 comprise scattering structures, such gas filled voids, scattering particles, such as ceramic materials, dopants, or the like. The nano-sized structures 125 may occur throughout the core 120 (as depicted in FIGS. 4A and 4B), or may occur near the interface of the core 120 and the cladding 122 (e.g., the core-cladding boundary), or may occur in an annular ring within the core 120. Some examples of light-diffusing optical fibers having randomly arranged and randomly sized voids (also referred to as "random air lines" or "nanostructures" or "nano-sized structures") are described in U.S. Pat. No. 7,450,806, and in U.S. patent application Ser. Nos. 12/950,045, 13/097,208, and 13/269,055, herein incorporated by reference in their entirety.

Alternatively, the light diffusing optical fiber 110 may have a "roughened" core 120, where the irregularities on the surface of the core 120 at the core-cladding boundary causes light scatter. Other types of light diffusing optical fibers may also be utilized. In operation, the light diffusing optical fiber 110 may undergo scattering-induced attenuation (i.e., attenuation due to light lost through the outer surface 128 of the light diffusing optical fiber 110, not due to absorption of scattering particles within the core) about 50 dB/km or greater, for example from about 100 dB/km to about 60000 dB/km at an illumination wavelength (e.g., the wavelength(s) of emitted radiation).

In embodiments in which the nano-sized structures 125 comprise gas filled voids, the gas filled voids may be arranged in a random or organized pattern and may run parallel to the length of the light diffusing optical fiber 110 or may be helical (i.e., rotating along the long axis of the light diffusing optical fiber 110). Further, the light diffusing optical fiber 110 may comprise a large number of gas filled voids, for example more than 50, more than 100, or more than 200 voids in the cross section of the fiber. The gas filled voids may contain, for example, $SO_2$, Kr, Ar, $CO_2$, $N_2$, $O_2$, or mixtures thereof. However, regardless of the presence or absence of any gas, the average refractive index in region of the core 120, the cladding 122, or the core-cladding boundary that comprises the plurality of nano-sized structures 125 is lowered due to the presence of voids. Further, the plurality of nano-sized structures 125 such as voids can be randomly or non-periodically disposed in the core 120, the cladding 122, or the core-cladding boundary, however, in other embodiments the voids may be periodically disposed.

The cross-sectional size (e.g., diameter) of the voids, such as gas filled voids (or other scattering particles) may be from about 10 nm to about 10 μm and the length may vary from about 1 μm to about 50 m. In some embodiments, the cross sectional size of the voids (or other scattering particles) is about 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 μm, 2 μm, 3 μm, 4 μm, 5 μm, 6 μm, 7 μm, 8 μm, 9 μm, or 10 μm. In some embodiments, the length of the voids is about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1000 μm, 5 mm, 10 mm, 50 mm, 100 mm, 500 mm, 1 m, 5 m, 10 m, 20 m, or 50 m.

Referring still to FIGS. 4A and 4B, the light diffusing optical fiber 110 may further comprise one or more additional layers, for example, coatings, jackets, or the like. For example, as depicted in FIGS. 4A and 4B, the light diffusing optical fiber 110 may comprise a first coating layer 130 and a scattering layer 132. The first coating layer 130 may comprise a substantially clear layer surrounding the core 120 and cladding 122 for ease of mechanical handling, for example, a polymer coating. Further, the scattering layer 132 may be positioned surrounding the core 120, the cladding 122, and in some embodiments, the first coating layer 130. The scattering layer 132 may comprise a base material (for example, a polymer) and a scattering material positioned in the base material. In operation, the scattering layer 132 may facilitate uniform angular scattering over a large angular range (e.g., 40 to 120°, or 30° to 130°, or 15 to 150°). For example, the light diffusing optical fiber 110 is configured to provide substantially uniform illumination due to scattering, such that the difference between the minimum and maximum scattering illumination intensity is less than 50% of the maximum scattering illumination intensity, for all viewing angles between 40 and 120 degrees.

In some embodiments, the scattering material may comprise a sublayer within the scattering layer 132. For example, in some embodiments, the sublayer may have a thickness of about 1 µm to about 5 µm. In other embodiments, the thickness of the particle sublayer and/or the concentration of the scattering material (e.g., scattering particles) in the scattering layer 132 may be varied along the axial length of the light diffusing optical fiber 110 so as to provide more uniform variation in the intensity of light scattered from the light diffusing optical fiber 110 at large angles (i.e., angles greater than about 15 degrees). For example, the angular illumination for all viewing angles between 40 and 120 degrees is within 50% of maximum illumination, and in some embodiments within 30%. In some embodiments, the angular illumination for all viewing angles between 40 and 120 degrees is within 30% of maximum illumination, and in some embodiments within 25%.

In some embodiments the scattering material within the scattering layer 132 could be any scattering material that has a refractive index differential from the base material of the scattering layer 132 (e.g. a base polymer) of more than 0.05 (e.g., the difference in refractive indices between the base material and the scattering material is greater than 0.05). In some embodiments, the difference in refractive indices between base material and the scattering material is at least 0.1. That is, the index of refraction of the scattering material may be at least 0.1 larger than the index of refraction of the base material (e.g., of the polymer or other matrix material) of the scattering layer 132. The scattering material can be solid particles (e.g., organic or inorganic solid particles), liquid droplets, or gas bubbles. Example solid organic particles include pigments, polymers, or any organic material that can be incorporated into the base material as a powder. Further, scattering particles may be generated in-situ, via crystallization and/or phase separation, for example, polyethylene, polypropylene, syndiotactic polystyrene, nylon, polyethylene terephthalate, polyketones, and polyurethanes where the urethane functional groups align and crystallize during solidification. For example, during the cure or solidification of the material that becomes the scattering layer 132, crystals may form that function as light scattering sites. Further, when the scattering layer 132 is cured and/or solidified, the material of the scattering layer (e.g., the base material and the scattering material) may because incompatible causing the material to phase separate, forming droplets or particles that can scatter light, thus forming scattering sites. Examples of these would be, but are not limited to, styrene-butadiene-styrene block copolymers, polymethyl methacrylate in polystyrene, and acrylonitrile-butadiene-styrene.

If the scattering material is inorganic, the scattering particles can be, for example, pigments, oxides, or mineral fillers. Both organic and inorganic scattering particles can be generated, from grinding a solid, or may comprise small particles initially (for example, from emulsion polymerization or solgels). In some embodiments, the solid scattering particles are inorganic oxides like silica, alumina, zirconia, titania, cerium oxide, tin oxide, and antimony oxide. Ground glass, ceramics, or glass-ceramics can also be utilized as scattering particles. Ground silicates or mineral fillers like quartz, talc, mullite, cordierite, clay, nepheline syenite, calcium carbonate, aluminum trihydrate, barium sulfate, wallastonite, mica, feldspar, pyrophyllite, diatomite, perlite, and cristobalite can utilized in scattering layer 132 as scattering particles, to provide the uniform angular illumination intensity of the diffused light.

In embodiments in which the scattering material comprises scattering particles, the cross-sectional size of the scattering particles within the scattering layer 132 may comprise $0.1\lambda$ to $10\lambda$, where $\lambda$ is the wavelength of light propagating through the light diffusing optical fiber 110. In some embodiments, the cross-sectional size of the scattering particles is greater than $0.2\lambda$ and less than $5\lambda$, for example, between $0.5\lambda$ and to $2\lambda$. The amount of scattering particles can vary from about 0.005% to 70% by weight, for example, 0.01% to 60%, 0.02% to 50%, or the like. In general, the thinner the scattering layer 132, the larger amount of scattering particles should to be present within that scattering layer 132.

Referring now to FIG. 4B, unscattered, guided light propagates along the light diffusing optical fiber 110 from the light output device 140 in the direction shown by arrow 10. Scattered light is shown exiting the light diffusing optical fiber 110 in the direction shown by arrow 12 at a scattering angle $\theta_S$, which is the angular difference between the propagation direction 10 of guided light propagating along the light diffusing optical fiber 110 and the direction 12 of the scattered light when it leaves light diffusing optical fiber 110. In some embodiments, the intensities of the spectra when the scattering angle $\theta_S$ is between 15° and 150°, or 30° and 130° are within ±50%, ±30%, ±25%, ±20%, ±15%, ±10%, or ±5% as measured at the peak wavelength. In some embodiments, the intensities of the spectra when the scattering angle $\theta_S$ is between all angles within 30° and 130°, or 40° and 120° are at least within ±50%, for example ±30%, ±25%, ±20%, ±15%, ±10%, or ±5% as measured at the peak wavelength. Accordingly, the light diffusing optical fiber 110 is configured to provide substantially uniform illumination due to scattering, such that the difference between the minimum and maximum scattering illumination intensity is less than 50% of the maximum scattering illumination intensity, for all viewing angles between at least 40 degrees and 110 degrees, for example for all viewing angles between 40 degrees and 120 degrees. According to some embodiments, the difference between the minimum and maximum scattering illumination intensity is not greater than 30% of the maximum scattering illumination intensity.

Referring still to FIGS. 4A and 4B, the light diffusing optical fiber 110 may have a scattering induced attenuation loss of greater than about 0.2 dB/m at a wavelength of 550 nm. For example, in some embodiments, the scattering induced attenuation loss (attenuation loss due to the nano-sized structures 125, such as air lines) may be greater than about 0.5 dB/m, 0.6 dB/m, 0.7 dB/m, 0.8 dB/m, 0.9 dB/m, 1 dB/m, 1.2 dB/m, 1.4 dB/m, 1.6 dB/m, 1.8 dB/m, 2.0 dB/m, 2.5 dB/m, 3.0 dB/m, 3.5 dB/m, or 4 dB/m, 5 dB/m, 6 dB/m, 7 dB/m, 8 dB/m, 9 dB/m, 10 dB/m, 20 dB/m, 30 dB/m, 40 dB/m, or 50 dB/m at 550 nm. In some embodiments, the average scattering loss of the light diffusing optical fiber 110 is greater than 50 dB/km, and the scattering loss does not vary more than 20% (i.e., the scattering loss is within ±20% of the average scattering loss, for example within ±15%, or within ±10%) over any given fiber segment of the light diffusing optical fiber 110. In some embodiments, the average scattering loss of the light diffusing optical fiber 110 is greater than 50 dB/km, and the scattering loss does not vary more than 20% (i.e., the scattering loss is within ±20% of the average scattering loss, for example within ±15%, or even within ±10%) over any given fiber segment of the light diffusing optical fiber 110 of from about 0.2 m to about 50 m, for example, 0.5 m, 1 m, 2 m, 5 m, 10 m, 15 m, 20 m, 25 m, 30 m, 35 m, 40 m, 45 m, or the like.

Referring again to FIGS. 1A-4B a method of tuning the equilibrium coupling length formed within the light diffusing optical fiber 110 may comprise directing light output by the light source 142 of the light output device 140 into the end face 116, 116' of the first end 112 of the light diffusing optical fiber 110 at a first incident angle $\theta_{i1}$ that is non-orthogonal to the end face 116, 116'. For example, the first incident angle $\theta_{i1}$ may be within approximately 10° of $\sin^{-1} NA_{LDF} - \sin^{-1} NA_O$, for example, within 9°, 8°, 7°, 6°, 5°, 4°, 3, 2°, 1°, or the like. Further, the first incident angle $\theta_{i1}$ may be from about 5° to about 25°, for example, about 10° to about 25°, 10° to about 20°, 15° to about 25°, 5° to about 15°, 12° to about 16°, 5° to about 25° or the like.

The method next comprises altering a relative angular position between the light output device 140 and the end face 116, 116' of the first end 112 of the light diffusing optical fiber 110 such that light output by the light source 142 of the light output device 140 is directed into the end face 116, 116' of the first end 112 of the light diffusing optical fiber 110 at a second incident angle $\theta_{i1}$. The second incident angle $\theta_{i2}$ is different than the first incident angle $\theta_{i1}$ but is still non-orthogonal to the end face 116, 116' of the first end 112 of the light diffusing optical fiber 110. Further, the second incident angle $\theta_{i2}$ may be within approximately 10° of $\sin^{-1} NA_{LDF} - \sin^{-1} NA_O$, for example, within 9°, 8°, 7°, 6°, 5°, 4°, 3, 2°, 1°, or the like. Further, the second incident angle $\theta_{i2}$ may be from about 5° to about 25°, for example, about 10° to about 25°, 10° to about 20°, 15° to about 25°, 5° to about 15°, 12° to about 16°, 5° to about 25° or the like. Altering the relative angular position between the light output device 140 and the end face 116, 116' of the first end 112 of the light diffusing optical fiber 110 may comprise altering the position (e.g., moving) of one or more of optical components of the light output device 140, altering the position (e.g., moving) the first end 112 of the light diffusing optical fiber 110, or a combination thereof.

Referring still to FIGS. 1A-4B, when directing light output by the light source 142 of the light output device 140 into end face 116, 116' of the first end 112 of the light diffusing optical fiber 110 at the first incident angle $\theta_{i1}$, the equilibrium coupling length comprises a first equilibrium coupling length and when directing light output by the light source 142 of the light output device 140 into end face 116, 116' of the first end 112 of the light diffusing optical fiber 110 at the second incident angle $\theta_{i1}$, the equilibrium coupling length comprises a second equilibrium coupling length that is shorter than the first equilibrium coupling length. For example, the altering the relative angular position between the light output device 140 and the end face 116, 116' of the first end 112 of the light diffusing optical fiber 110 may shorten the equilibrium coupling length. Further, in some embodiments, the second incident angle $\theta_{i2}$ may comprise an angle that is closer to $\sin^{-1} NA_{LDF} - \sin^{-1} NA_O$ than the first incident angle $\theta_{i1}$.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An illumination system comprising:
a light diffusing optical fiber; and
a light output device comprising a light source, wherein
the light diffusing optical fiber comprises a first end, a second end opposite the first end, a core, a cladding surrounding the core, an outer surface, and a plurality of nano-sized structures positioned within the core, the cladding, or both the core and the cladding,
the plurality of nano-sized structures are configured to scatter guided light toward the outer surface of the light diffusing optical fiber such that a portion of the guided light diffuses through the outer surface along a diffusion length of the light diffusing optical fiber,
the light diffusing optical fiber comprises a numerical aperture $NA_{LDF}$,
the light output device comprises an effective numerical aperture $NA_O$, which is less than the numerical aperture $NA_{LDF}$ of the light diffusing optical fiber, and
the light output device is optically coupled to an end face of the first end of the light diffusing optical fiber such that a light propagation pathway of light output by the light source of the light output device forms an incident angle $\theta_i$ with respect to the end face that is non-orthogonal to the end face and is within approximately 5° of $\sin^{-1} \text{NA}_{LDF} - \sin^{-1} \text{NA}_O$.

2. The illumination system of claim 1, wherein the incident angle $\theta_i$ is approximately equal to $\sin^{-1} \text{NA}_{LDF} - \sin^{-1} \text{NA}_O$.

3. The illumination system of claim 1, wherein the incident angle $\theta_i$ is from about 5° to about 30°.

4. The illumination system of claim 1, wherein the incident angle $\theta_i$ is from about 15° to about 25°.

5. The illumination system of claim 1, wherein the end face of the first end of the light diffusing optical fiber is an angled end face.

6. The illumination system of claim 1, wherein the end face of the first end of the light diffusing optical fiber is a normal end face.

7. The illumination system of claim 1, wherein the light output device further comprises a lens positioned between and optically coupled to the light source and the end face of the first end of the light diffusing optical fiber.

8. The illumination system of claim 1, wherein the light output device further comprises an optical delivery fiber positioned between and optically coupled to the light source and the end face of the first end of the light diffusing optical fiber.

9. The illumination system of claim 1, wherein when light output by the light source of the light output device irradiates the end face of the first end of the light diffusing optical fiber at the incident angle $\theta_i$, the incident angle $\theta_i$ induces a coupling loss of about 1.5 dB or less at the end face.

10. The illumination system of claim 1, wherein when light output by the light source of the light output device irradiates the end face of the first end of the light diffusing optical fiber at the incident angle $\theta_i$, the incident angle $\theta_i$ induces a coupling loss of about 1 dB or less at the end face.

11. The illumination system of claim 1, wherein the diffusion length of the light diffusing optical fiber comprises an equilibrium coupling length extending from the end face of the first end of the light diffusing optical fiber a distance of from about 2% to about 5% of the diffusion length.

12. The illumination system of claim 1, wherein the plurality of nano-sized structures are configured to scatter guided light toward the outer surface of the light diffusing optical fiber such that a portion of the guided light diffuses through the outer surface along the diffusion length of the light diffusing optical fiber to provide a scattering induced attenuation of about 50 dB/km or more.

13. The illumination system of claim 1, wherein:
the light diffusing optical fiber comprises a scattering layer surrounding the core and the cladding;
the scattering layer comprises a scattering material and is configured such that a difference between the minimum and maximum scattering illumination intensity is less than 50% of the maximum scattering illumination intensity, for all viewing angles between 40 and 120 degrees.

14. The illumination system of claim 1, wherein the plurality of nano-sized structures comprise gas filled voids.

15. An illumination system comprising:
a light diffusing optical fiber; and
a light output device comprising a light source, wherein the light diffusing optical fiber comprises a first end, a second end opposite the first end, a core, a cladding surrounding the core, an outer surface, and a plurality of nano-sized structures positioned within the core, the cladding, or both the core and the cladding,
the plurality of nano-sized structures are configured to scatter guided light toward the outer surface of the light diffusing optical fiber such that a portion of the guided light diffuses through the outer surface along a diffusion length of the light diffusing optical fiber,
the light diffusing optical fiber comprises a numerical aperture $\text{NA}_{LDF}$,
the light output device comprises an effective numerical aperture $\text{NA}_O$, which is less than the numerical aperture $\text{NA}_{LDF}$ of the light diffusing optical fiber,
the light output device is optically coupled to an end face of the first end of the light diffusing optical fiber such that a light propagation pathway of light output by the light source of the light output device forms an incident angle $\theta_{i1}$ with respect to the end face that is non-orthogonal to the end face; and
the diffusion length of the light diffusing optical fiber comprises an equilibrium coupling length extending from the end face of the first end of the light diffusing optical fiber a distance of about 5% of the diffusion length or less.

16. The illumination system of claim 15, wherein the incident angle $\theta_i$ is from about 15° to about 25°.

17. The illumination system of claim 15, wherein when light output by the light source of the light output device irradiates the end face of the first end of the light diffusing optical fiber at the incident angle $\theta_i$, the incident angle $\theta_i$ induces a coupling loss of about 1.5 dB or less at the end face.

18. A method comprising:
directing light output by a light source of a light output device into an end face of a first end of a light diffusing optical fiber such that a light propagation pathway of light forms a first incident angle $\theta_{i1}$ with respect to the end face; wherein:
the light diffusing optical fiber comprises the first end, a second end opposite the first end, a core, a cladding surrounding the core, an outer surface, and a plurality of nano-sized structures positioned within the core, the cladding, or both the core and the cladding,
the plurality of nano-sized structures are configured to scatter guided light toward the outer surface of the light diffusing optical fiber such that a portion of the guided light diffuses through the outer surface along a diffusion length of the light diffusing optical fiber,
the light diffusing optical fiber comprises a numerical aperture $\text{NA}_{LDF}$,
the light output device comprises an effective numerical aperture $\text{NA}_O$, which is less than the numerical aperture $\text{NA}_{LDF}$ of the light diffusing optical fiber, and
the first incident angle $\theta_{i1}$ is non-orthogonal to the end face of the first end of the light diffusing optical fiber and is within approximately 5° of $\sin^{-1} \text{NA}_{LDF} - \sin^{-1} \text{NA}_O$; and
altering a relative angular position between the light output device and the end face of the first end of the light diffusing optical fiber such that the light propagation pathway forms a second incident angle $\theta_{i2}$ with respect to the end face that is non-orthogonal and is within approximately 5° of $\sin^{-1} \text{NA}_{LDF} - \sin^{-1} \text{NA}_O$.

19. The method of claim 18, wherein:
the diffusion length of the light diffusing optical fiber comprises an equilibrium coupling length extending from the end face of the first end of the light diffusing optical fiber;

when directing light output by the light source of the light output device into the end face of the first end of the light diffusing optical fiber at the first incident angle $\theta_{i1}$, the equilibrium coupling length comprises a first equilibrium coupling length; and when directing light output by the light source of the light output device into the end face of the first end of the light diffusing optical fiber at the second incident angle $\theta_{i2}$, the equilibrium coupling length comprises a second equilibrium coupling length that is shorter than the first equilibrium coupling length.

20. The method of claim 18, wherein the second incident angle θ, is from about 15° to about 25°.

* * * * *

UNITED STATES PATENT AND TRADEMARK OFFICE
CERTIFICATE OF CORRECTION

PATENT NO. : 11,105,967 B2  
APPLICATION NO. : 16/604749  
DATED : August 31, 2021  
INVENTOR(S) : Stephan Lvovich Logunov Page 1 of 1

It is certified that error appears in the above-identified patent and that said Letters Patent is hereby corrected as shown below:

On the Title Page

On page 2, in Column 1, item (57), Abstract, Line 2, delete "θi," and insert -- $\theta_i$, --, therefor.

In the Claims

In Column 15, Line 13, Claim 20, delete "θ," and insert -- $\theta_i$ --, therefor.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*